United States Patent [19]
Riedel et al.

[11] 3,920,899
[45] Nov. 18, 1975

[54] METHOD AND APPARATUS FOR THE TESTING OF SINGLE CURRENT-DOUBLE CURRENT CONVERTER CIRCUITS AND ASSOCIATED TRUNK LINES IN CENTRALLY CONTROLLED DATA SWITCHING INSTALLATIONS

[75] Inventors: Ekkehard Riedel; Lothar Schmid; Fritz Giebler, all of Munich, Germany

[73] Assignee: Siemens Aktiengesellschaft, Berlin & Munich, Germany

[22] Filed: Feb. 27, 1974

[21] Appl. No.: 446,474

Related U.S. Application Data

[63] Continuation of Ser. No. 243,899, April 13, 1972, abandoned, which is a continuation of Ser. No. 883,772, Dec. 10, 1969, abandoned.

[52] U.S. Cl. ........................ 178/69 G; 179/175.3 R
[51] Int. Cl. ........................ H04l 25/02
[58] Field of Search ...... 178/69 G, 58; 179/175.3 R, 179/175.31 R

[56] References Cited

UNITED STATES PATENTS

| | | | |
|---|---|---|---|
| 2,709,784 | 5/1955 | Spaulding | 179/175.3 R |
| 3,526,729 | 9/1970 | Andrews et al. | 179/175.3 R |

OTHER PUBLICATIONS

Teleprinter Switching by Rossberg and Korta, pp. 30–34, 1960.

*Primary Examiner*—Kathleen H. Claffy
*Assistant Examiner*—Douglas W. Olms

[57] ABSTRACT

A method and circuit arrangement are described by means of which a testing exchange station can determine whether a predetermined converter circuit and out-going trunk line are in an operative condition or a busy signal will be received therefrom. The method contemplates transmitting a test signal from a testing exchange station to the converter circuit in question and determining the conditions of the tested converter circuit by determining the condition of a reflected signal from said tested converter circuit to said testing exchange station. An apparatus is described whereby this reflecting procedure is facilitated by replacing the reflection-preventing contacts in the holding circuit for a transmission relay in the converter circuit with a continuous connection. Further, in those converter circuits which are permanently connected to a subscriber line contacts are added to the holding circuits for a transmission relay, and these contacts will connect a resistor in the holding circuit to a stop polarity. The aforementioned contacts are open when the converter circuit is in a dial condition.

8 Claims, 4 Drawing Figures

EKKEHARD REIDEL, LOTHAR SCHMID AND FRITZ GEBLER
BY: Birch, Swindler, McKie and Beckett
Their Attorneys EKKEHARD RIEDEL, LOTHAR SCHMID AND FRITZ GIEBLER
By: Birch, Swindler, McKie and Beckett

METHOD AND APPARATUS FOR THE TESTING OF SINGLE CURRENT-DOUBLE CURRENT CONVERTER CIRCUITS AND ASSOCIATED TRUNK LINES IN CENTRALLY CONTROLLED DATA SWITCHING INSTALLATIONS

This is a continuation of application Ser. No. 243,899, filed Apr. 13, 1972 now abandoned which is a continuation of application Ser. No. 883,772, filed Dec. 10, 1969, now abandoned.

BACKGROUND OF THE INVENTION

This invention relates to a methode and apparatus for the testing of a single current-double current converter circuit and the trunk lines associated therewith in a centrally controlled data exchange installation.

In teleprinter installations it is well known that individual subscriber lines are frequently connected to the subscriber circuit in the exchange station over two-wire, single current lines. In such circuit arrangements in order to establish separate paths in the incoming and outgoing directions and to convert the available single current into a double current for switching purposes, it is necessary that each subscriber circuit be provided in some manner with a converter circuit for the reasons given hereinabove. A single current-double current converter circuit may either be assigned to the subscriber circuits as needed over through-connection networks, which are selectors or switching matrices or the like over which a plurality of subscribers are connected to a smaller number of converters, or, as in the case of time division multiplex exchange installations, be permanently assigned to each subscriber line. These converter circuits can operate directly with a full exchange or they may be connected to a partial exchange which is connected over a trunk line with an associated full exchange. In such circuit arrangements the problem is created as to how to test the converter circuits or the converter circuits and the associated trunk lines to determine their working condition prior to the completion of a connection therethrough.

The prior art teaches that it is known to test trunk lines between full exchanges or between a full exchange and concentrators through cell acknowledgment signals by means of special transmission and receiving systems associated therewith. These special systems give rise to the additional expenses in constructing such systems which it would be highly desirable to avoid, particularly in remote controlled partial exchanges.

It is therefore an object of this invention to provide a method and apparatus for testing the operational readiness of converter circuits and associated trunk lines without requiring the added expense and complexity of special transmission and receiving systems in the converter circuits and in the exchange stations which are connected with the testing exchange station over the trunk lines to be tested.

SUMMARY OF THE INVENTION

The aforementioned and other objects are obtained by transmitting a test signal from a testing exchange station to the converter circuit, and reflecting the test signal from the tested converter circuit for evaluation at the testing exchange station. The converter circuit may be operated or specially constructed to provide for reflecting the test signals. The testing exchange station may operate to evaluate the test signal by measuring the travel time and the duration of the reflective signals, and with the aid of these perameters it may determine whether the outgoing trunk lines and the converter circuit associated therewith are operative so that a connection may be made therethrough, or whether the calling subscriber will receive a busy signal indicating the outgoing trunk line, or the associated converter circuit, is blocked from further seizing. The means for performing this evaluation is not a part of the invention described herein, and accordingly, such means are not described in detail herein. By utilizing existing circuitry, the additional expense discussed above is aboided.

BRIEF DESCRIPTION OF THE DRAWINGS

The advantages and mode of operation of the invetion described herein may be best understood by reference to a description of the preferred embodiments given hereinbelow in conjunction with the drawings in which.

DETAILED DESCRIPTION OF THE DRAWINGS

In each of the embodiments discussed hereinbelow the single current-double current converter circuits are shown as being connected in partial exchange stations, which are connected over trunk lines with an associated full exchange station. The partial exchange stations are remote controlled, with the aid of operating data transmission systems, by the centrally controlled full exchange station. A subscriber connected to the partial exchange station first communicates a desire to establish a connection to the full exchange station over a special line, and he can dial only after a free trunk line has been assigned to him.

Figure 1:
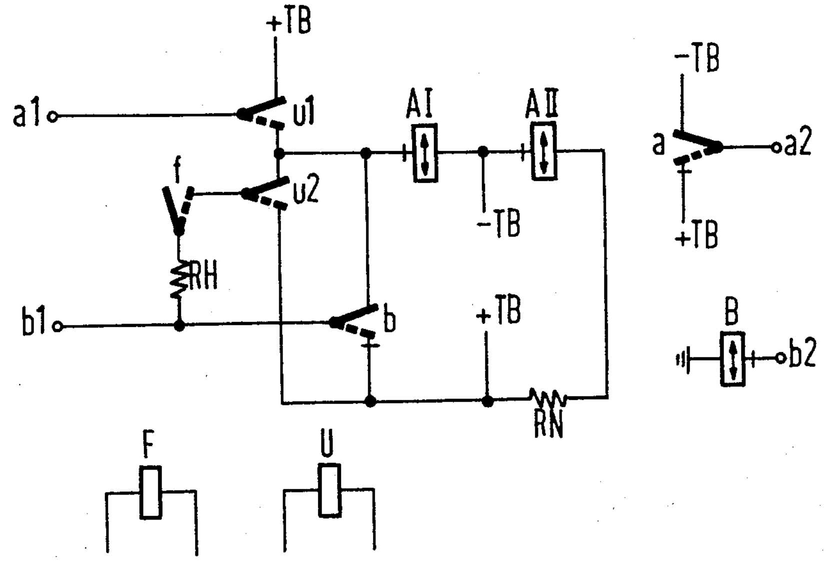
FIG. 1 illustrates a typical schematic diagram of a conventional two wire, single current-four wire, double current converter circuit for short circuit holding current scanning.

In FIG. 1 the single current-double current converter circuit shown is used for short circuit holding currents scanning, and this converter circuit is well known to those skilled in the art. Terminals a1 and b1 are connected with each other by a low resistance subscriber loop (not shown) of the single current subscriber. A trunk line (not shown) is connected to the terminals *a2* and *b2*. The circuits are terminated above ground. The converter circuit of FIG. 1 contains two connection supervision systems, namely relay F and relay U which are connected in the known manner to recognize the extinction of a connection by a calling and the called subscribers, respectively. Relay F controls the contact f lying in the holding circuit of relay A. This holding circuit comprises a positive voltage contact +TB, contact *u2*, contact *f*, a resistor RH, contact b in a start position (shown in full line), transmission relay AI and a negative voltage contact −TB. The relay F has a drop-out time of 300 milliseconds and a negligible increase time. Relay U effects, through the switching of contacts $u1$ and $u2$, a repoling of the subscriber loop. The relay U in this preferred embodiment has a drop-out time of 600 milliseconds with an increase time of 50 milliseconds. Each of the contact positions shown in full line in FIG. 1 represent the rest position of the converter circuit, and the contacts shown in dotted or broken line in the figure illustrate the contact positions for the writing condition of the converter circuit.

The contact f in the holding circuit for transmission relay A, in its open condition, will act to prevent a signal received at terminal $b2$ from being reflected through terminals $a2$ when the subscriber loop is open circuited. If, for example, the single current subscriber interrupts the subscriber loop in order to signal a release desire, the current is interrupted by relay winding AI, and contact a is shifted to the stop position at +TB for at least 600 milliseconds. After 300 milliseconds, relay F will drop out, and contact $f$ will open. If, after the expiration of the connection supervision time on the opposite side, after which the relay AI will drop out with the contact a being returned to the start position, and a start potential arrives on the $b2$, the holding circiut of relay A will then remain uninterrupted due to the fact that contact $f$ is now open. If, however, holding resistor RH were directly connected to contact $u2$ or if contact $f$ were still closed at the arrival of the start potential at $b2$, the holding circuit of relay A would be closed, because the current flow through the conductor from terminals $b2$ will operate relay B thereby shifting contact $b$ into the start position. Relay A, thereby having current flowing therethrough, will transmit a stop or positive polarity on the $a2$ conductor. The latter relay will thereby for example, effect a new call on the opposit side.

It is known in the art to avoid distrubances caused by undesired reflections by appropriate measures in the central control of the exchange. In this case, contacts f in the holding circuit of relay A can be eliminated. The converter circuits themselves will then have reflecting properties, which according to the invention, are used to test their operational readiness.

The evaluation of a reflected signal, such as that described above, as is known, can be carried out by simple time measurements. These measurements comprise the measurement of the transit time of a pulse, as well as a measurement of the width of a pulse. This measuring technique is well known in the art, as indicated by the description of it given in "Principles and Practice of Radar" by R.S.H. Boulding, 7th ed., Verlag George Newnes Limited, particularly at pp. 1–4 therein. The measured times are, subsequently, compared with limiting values. Equipment for performing such time measurements is well known in the art and need not be described in detail herein. For example, it is known to use digital counters for measuring time electronically. Thus, for example, a counter can be coupled to the line to be tested, and the counting operation can be initiated when a control pulse is transmitted. The counter will continue to operate until such time as the reflected control pulse arrives back at the exchange installation. The counter circuit can be constructed to be stopped by such a return pulse. Simultaneously, another counter can be started by the leading edge of the control pulse and stopped by the trailing edge. In this way, one can obtain two counted values, one of which represents the total transit time of the pulse including transmission and reflection, and the other represents the duration for the width of the pulse.

Figure 2:
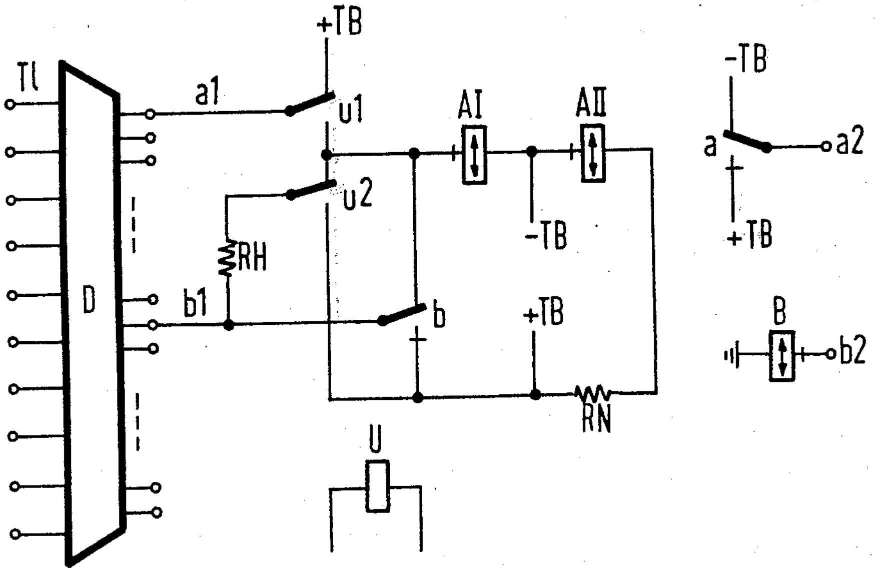
FIG. 2 illustrates, by means of a schematic diagram, a single current-double current converter circuit having no reflection preventing means, the converter circuit is shown as being prepared for the writing condition.

FIG. 2 illustrates a two wire, single current-four wire, double current converter circuit for short circuit holding current scanning in which relay F along with its contact $f$ has been removed. The resistor RH is directly connected to contact $u2$ thereby removing the reflection prevention means. The embodiment of the converter circuit as shown is applied in exchange stations wherein the converter circuits are assigned to the individual subscriber circuits, as needed, over a through-connection network. An example of such exchange stations would be the remote controlled partial exchange designed for space division multiplex operation.

As in FIG. 1 terminals $a2$ and $b2$ are connected to a trunk line (which is not shown) which in turn is connected to the controlling full exchange. Terminals $a1$ and $b1$ are, however, connected to subscriber lines T1 over the through-connection network D. It will be noted that the only difference between the converter circuits in FIGS. 1 and 2 lies in the fact that the relay F along with its contact $f$ have been eliminated in the FIG. 2 circuit.

The converter circuit shown in FIG. 2 will have the ability to reflect a signal received on the $b2$ conductor on the $a2$ conductor when no through connection exists in network D, i.e. when no connection exists between terminals $a1$ and $b1$. The polarity of the reflected signal will depend on the condition of the converter circuit. The contact positions shown in FIG. 2 correspond to the rest condition. If, while the contacts are in this position, the controlling full exchange should transmit a test impulse on the $b2$ conductor to the converter circuit, the contact $b$ will be switched to +TB and with this switching action a circuit will be completed over +TB, contact $b$, holding resistor RH, contact $u2$, winding AI and −TB. With the completion of the latter circuit winding AI will switch contact a to the stop polarity +TB, and the test impulse will by this means be transmitted back to the full exchange with the same polarity to be evaluated there.

It is to be noted that converter and trunk line testing may also be accomplished if the converter circuits are already prepared for the writing condition so long as no connection has been completed in the through-connection network D. The testing of the converter circuit in the latter operating condition is demonstrated in FIG. 3. The designation of this condition as being the "prepared for writing condition" is somewhat arbitrary in that it would also be possible fundamentally to leave the converter circuits in this particular condition after the release of a connection. In addition it could be possible as well to test the circuit in the described manner after relay U has responded.

Figure 3:
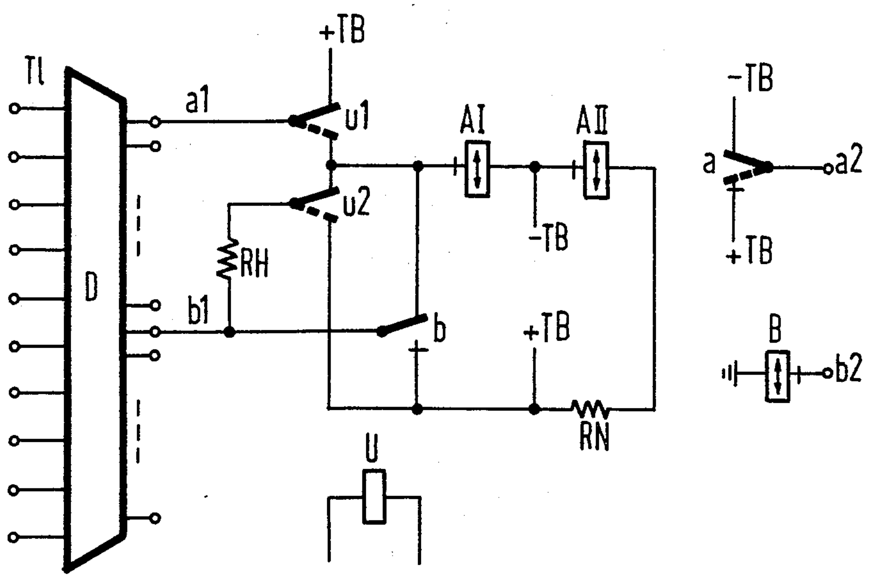
FIG. 3 is a schematic diagram of the FIG. 2 embodiment illustrating the prepared for writing condition and FIG. 4 illustrates, by means of a schematic diagram, a single current-double current converter circuit permanently connected to a subscriber line wherein testing of the converter circuit in the dialing condition is accomplished by means of the dial request signal transmitted thereto.

In FIG. 3 the contacts shown by broken or dotted lines correspond to to the "prepared for writing condition." In this condition relay winding AI has a current passing therethrough so that contact a will be in the stop position at +TB. If the converter circuit should now receive a test impulse on the $b2$ conductor, contact b will shift into the stop position or to +TB, and the current through relay winding AI will be interrupted. Interruption of the current through relay AI will cause contact a to connect terminal $a2$ with the start potential at −TB. Thus, the test impulse is transmitted back to the full exchange with reversed polarity.

Figure 4:
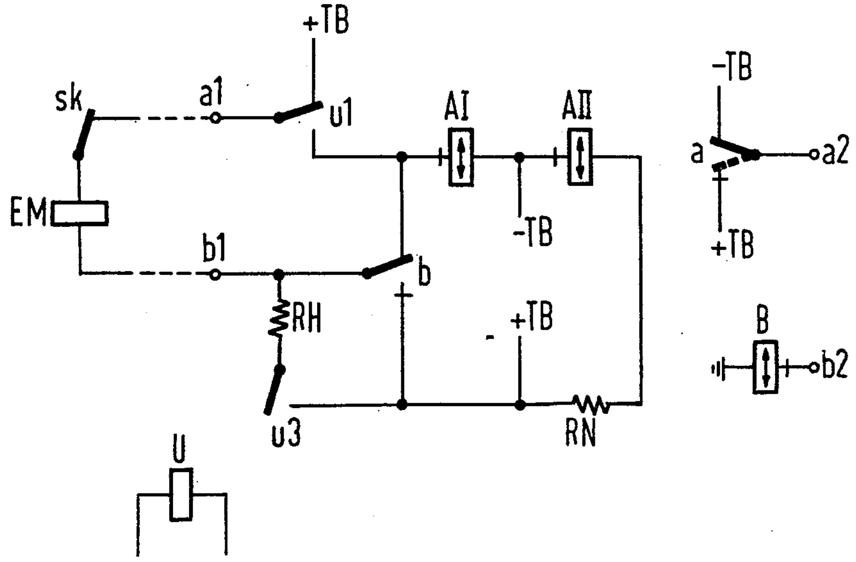

FIG. 4 illustrates schematically a converter circuit which is fixedly assigned to a subscriber line. An example of such a connection scheme is the pure time division multiplex exchange system. In this circuit arrangement the testing of the converter circuit in the dialing condition is possible through use of the dial request signal transmitted to the subscriber at the beginning of a connection.

In this figure terminal *a*1 is connected with terminal *b*1 over a transmission contact sk which is closed in the dial condition, a receiving magnet EM and the subscriber line. Transfer contact *u*2 connected in series with holding resistor RH in the FIGS. 1 and 2 circuits is replaced in this FIG. 4 circuit by an operating contact *u*3, which in the closed condition attaches the stop polarity to the holding resistor RH. In the dial condition, to which the stop position or broken line condition of contact a corresponds the subscriber loop and the relay winding AI are traversed by a current. If the controlling full exchange should now transmit dial request signal, which is customarily a 25 millisecond stop-polarity pulse, contact *b* will be transferred into the stop position, and the subscriber loop will be short circuited. At this point, there will be no current flow through relay AI and contact a will shift into the start position shown in full line. Thus, the dial request signal is transmitted back to the full exchange with the reversed polarity. Operating contact *u*3 which acts to prevent, in the dial condition, the reflection of the dial request signal is controlled into a closed condition only by a "connected" signal.

With each of the embodiments of the invention discussed hereinbefore, it is to be pointed out that it may be necessary to take appropriate measures well known to those well skilled in the art in controlling the testing exchange to prevent distortions due to undesired reflections from the converter circuit.

The preferred embodiments and the modes of operation described hereinabove are only exemplary, and it will be apparent to those well skilled in the art that modifications may be made within the scope of the appended claims.

We claim:

1. A method for producing reflected test signals for testing converter circuits and associated trunk lines in data switching exchanges where the converter circuits are assigned to the subscriber lines over a through-connection network, said testing being carried out by analyzing signal waveforms reflected from the tested circuits, comprising:

transmitting a test signal formed by a pulse to the converter circuit to be tested prior to the completion of the connection in said through-connection network and causing said test signal to be reflected by said tested converter circuit.

2. The method defined in claim 1 wherein said transmitted signal is an impulse wave form.

3. The method defined in claim 1 wherein all of the contacts in said converter circuits are in a rest condition when said test signal is transmitted.

4. The method defined in claim 1 wherein said converter circuit is in a prepared for writing condition when said test signal is transmitted.

5. In a conventional single current-double current converter circuit of the type which would have reflection-preventing contacts in a holding circuit for a transmission relay said reflection-preventing contacts being adapted to be opened when said converter circuit is in a rest condition, means for causing the reflection of a test signal transmitted to said converter circuit comprising:

continuous electrical connection means connected across said contacts as to remove said contacts from said holding circuit.

6. In a conventional single current-double current converter having a holding circuit for a transmission relay and adapted to be used in an exchange wherein one of said converter circuits is permanently connected to each subscriber line, means for causing the reflection of a test signal transmitted to said converter circuit comprising:

a relay for changing the polarity of a subscriber loop connected to said converter circuit, a resistor in said holding circuit, contact means operated by said relay connecting said resistor to a stop polarity, said contact means being opened when converter circuit is in a dial condition.

7. A method for producing reflected test signals for the testing of converter circuits and associated trunk lines in centrally controlled data exchange installations to determine the condition thereof by analyzing a test signal reflected from the tested circuits, comprising:

transmitting a test signal formed by a pulse from a testing exchange station to a preselected converter circuit and causing said test signal to be reflected by said preselected converter circuit to a testing exchange station for analysis therein, said converter circuit being conditioned so as to be ready to operate.

8. A method for producing reflected test signals for the testing of converter circuits and associated trunk lines in exchanges wherein a converter circuit is permanently assigned to each subscriber line, said testing being carried out by analyzing a signal waveform reflected from the tested circuits, comprising the steps of:

transmitting a dial request signal by a controlling exchange station to the converter circuit to be tested, when said converter circuit is in a dial condition and causing said request signal to be reflected by said testing converter circuit when in a dial condition.

* * * * *